United States Patent
Bemert et al.

(10) Patent No.: US 12,480,001 B2
(45) Date of Patent: Nov. 25, 2025

(54) POWDER PAINT COMPOSITION WHICH CAN BE REDISPERSED IN WATER

(71) Applicant: Wacker Chemie AG, Munich (DE)

(72) Inventors: Lada Bemert, Winhöring (DE); Klaus Bonin, Burghausen (DE); Udo Kotschi, Burghausen (DE); Hans-Peter Weitzel, Reischach (DE); Harald Zeh, Burghausen (DE)

(73) Assignee: Wacker Chemie AG, Munich (DE)

( * ) Notice: Subject to any disclaimer, the term of this patent is extended or adjusted under 35 U.S.C. 154(b) by 768 days.

(21) Appl. No.: 17/434,434

(22) PCT Filed: Feb. 28, 2019

(86) PCT No.: PCT/EP2019/055032
§ 371 (c)(1),
(2) Date: Aug. 27, 2021

(87) PCT Pub. No.: WO2020/173571
PCT Pub. Date: Sep. 3, 2020

(65) Prior Publication Data
US 2022/0145093 A1    May 12, 2022

(51) Int. Cl.
*C09D 5/03* (2006.01)
*C09D 7/61* (2018.01)
*C09D 131/04* (2006.01)

(52) U.S. Cl.
CPC ............ *C09D 5/033* (2013.01); *C09D 7/61* (2018.01); *C09D 131/04* (2013.01); *C08L 2205/025* (2013.01); *C08L 2205/03* (2013.01)

(58) Field of Classification Search
CPC ........ C09D 5/033; C09D 7/61; C09D 131/04; C08L 2205/025; C08L 2205/03
See application file for complete search history.

(56) References Cited

U.S. PATENT DOCUMENTS

| | | | | |
|---|---|---|---|---|
| 6,166,113 | A | * | 12/2000 | Haerzschel .......... C04B 24/2623 524/4 |
| 2005/0250899 | A1 | | 11/2005 | Bacher et al. |
| 2008/0081853 | A1 | | 4/2008 | Bacher et al. |
| 2008/0132624 | A1 | | 6/2008 | Killat et al. |
| 2017/0321375 | A1 | | 11/2017 | Melchin et al. |

FOREIGN PATENT DOCUMENTS

| | | | |
|---|---|---|---|
| DE | 3729090 A1 | * | 3/1989 |
| DE | 4300319 C1 | | 1/1994 |
| DE | 19751553 A1 | | 7/1999 |
| DE | 29921783 U1 | * | 8/2000 .......... C04B 24/085 |
| DE | 102004022405 A1 | | 12/2005 |
| EP | 1593721 A1 | | 11/2005 |
| WO | 2000047682 A1 | | 8/2000 |
| WO | 2006058655 A1 | | 6/2006 |
| WO | 2006061139 A1 | | 6/2006 |
| WO | 2016092047 A1 | | 6/2016 |

OTHER PUBLICATIONS

Machine English translation of DE 3729090, Distler et al., Mar. 9, 1989.*
Machine English translation of DE 29921783, Memmen, Aug. 17, 2000.*
Dr. J. Schulze in: TIZ-Fachberichte, vol. 109, No. 9, 1985, pp. 698-703.

* cited by examiner

*Primary Examiner* — Patrick D Niland

(57) ABSTRACT

A powder paint composition. The powder paint composition contains (a) at least one polymer powder which can be re-dispersed in water, (b) pigment and filler, and optionally (c) which may be one or more adjuvants and/or may be one or more hydraulic binders. The at least one polymer powder which can be re-dispersed in water contains a polyvinyl alcohol-stabilized copolymer that is based on (a1) a wt % of a vinyl acetate, (a2) a wt % of ethylene and optionally (a3) and/or (a4) wherein (a3) is vinyl esters of long-chain, optionally branched $C_3$ to $C_{12}$ carboxylic acids and (a4) is further ethylenically unsaturated comonomers that are co-polymerizable therewith.

18 Claims, No Drawings

POWDER PAINT COMPOSITION WHICH CAN BE REDISPERSED IN WATER

CROSS-REFERENCE TO RELATED APPLICATIONS

This application is a U.S. National Phase application of PCT Application No. PCT/EP2019/055032 filed on Feb. 28, 2019 the disclosure of which is incorporated by reference herein in its entirety.

FIELD OF THE DISCLOSURE

The invention relates to a powder paint composition, to processes for producing it, and to the use of the powder paint composition for producing emulsion paints.

Synthetic resin dispersion paints or, colloquially, emulsion paints are part of the most widely used paints and coatings product group, owing to their easy workability, the universal possibilities for configuration (coloring, effects), and for environmental reasons (avoidance of solvent emissions). The primary use of emulsion paints is as a wall paint in the interior and in the exterior sectors.

In a closed container, emulsion paints have a long shelf life. As soon as the container is opened, however, microbes rapidly enter the emulsion paint, leading possibly to its biodegradation and to the formation of mold. To protect from bacterial infestation, therefore, preservatives such as isothiazolinones are used in emulsion paints, and these preservatives may give rise to irritations and irritated skin, particularly in allergics. An alternative to this is to set a strongly alkaline pH of up to pH=13 in the emulsion paint. Such strongly alkalified emulsion paints may likewise lead to irritation and damage to the skin. Costly and inconvenient measures for workplace protection are therefore needed.

With the use of a dry powder paint, with a composition corresponding bar the water fraction to the composition of the emulsion paint, it has been possible to overcome the disadvantages identified above. With a water-free powder paint there is no need for protection from microbial contamination during storage. The storage and transport of dry powder paint can therefore take place in a substantially broader temperature range and over a substantially longer time period than in the case of aqueous emulsion paint formulations. A further advantage associated with the transport of a powder paint composition is that the weight of the paint is reduced by the water fraction. Another advantage is that when working with a powder paint composition, the required amount of aqueous emulsion paint can be prepared, and the rest of the powder paint can continue to be stored. This effectively reduces the volume of paint residues requiring disposal.

DE 4300319 C1 describes a water-soluble paint powder from which an emulsion paint can be produced by adding water. The binder proposed is a copolymer of vinyl acetate and ethylene. WO 2000/047682 A1 describes a dry powder composition which, after admixture of water, can be used as a coating material for plasterboard wall panels. The binder is a vinyl acetate-ethylene copolymer. DE 19751553 A1 describes aqueous dispersions and water-redispersable polymer powders, comprising a crosslinkable polymer with polyethylenically unsaturated monomer units, for use as binders for emulsion paints and powder paints and render. DE 102004022405 A1 discloses the use of protective colloid-stabilized copolymers in the form of their aqueous polymer dispersions or water-redispersable polymer powders in cement-free or low-cement coating materials.

The problem addressed was that of providing a powder paint composition which, when used to produce emulsion paints, furnishes coating materials with which coatings having high wet scrub resistance and high opacity are obtained.

The invention provides a powder paint composition comprising a) at least one water-redispersable polymer powder, b) pigment and filler, and c) optionally further adjuvants, characterized in that the water-redispersable polymer powder is a) a polyvinyl alcohol-stabilized copolymer based on a1) 50 to 95 wt % of vinyl acetate, a2) 1 to 30 wt % of ethylene, a3) 0 to 20 wt % of vinyl esters of long-chain, optionally branched $C_3$ to $C_{12}$ carboxylic acids, a4) 0 to 10 wt % of further ethylenically unsaturated comonomers copolymerizable therewith, the amounts in wt % adding up in each case to 100 wt %, and the polyvinyl alcohol comprising a mixture of at least one polyvinyl alcohol having a degree of hydrolysis of 80 to 95 mol % and a Höppler viscosity (4% aqueous solution, Höppler method at 20° C., DIN 53015) of 1 to 5 mPas and at least one polyvinyl alcohol having a degree of hydrolysis of 80 to 95 mol % and a Höppler viscosity of 6 to 40 mPas.

Water-redispersable polymer powder compositions (dispersion powders) are generally produced by drying the corresponding aqueous dispersions of a base polymer. The aqueous dispersion of the base polymer is produced preferably via radically initiated emulsion polymerization of one or more ethylenically unsaturated monomers. The resulting aqueous dispersion of the base polymer is subsequently dried, preferably in the presence of a drying aid (generally a protective colloid), via spray drying, for example. Antiblocking agents or other additives may optionally be added as well during or after the drying. One of the effects of the protective colloid fraction is to prevent the polymer particles sticking irreversibly to one another during the drying operation, the polymer particles instead being enveloped by the protective colloid particles. A second effect of this protective colloid matrix, which dissolves again when the polymer powder composition is dispersed in water, is that the polymer particles are again present with the particle size of the original dispersion in the aqueous (re)dispersion (TIZ-Fachberichte, 1985, vol. 109 (9), 698).

The water-redispersable polymer powder (dispersion powder) a) is obtained via radically initiated aqueous emulsion polymerization of the comonomers a1), a2), optionally a3), and optionally a4), and via subsequent drying of the resulting aqueous dispersion of the copolymer.

In general 50 to 95 wt %, preferably 60 to 95 wt %, more preferably 80 to 95 wt % of vinyl acetate a1) is copolymerized, based in each case on the total weight of the comonomers. Generally 1 to 30 wt %, preferably 5 to 20 wt %, of ethylene a2) is copolymerized, based in each case on the total weight of the comonomers.

Suitable vinyl esters a3) of long-chain, optionally branched $C_3$ to $C_{12}$ carboxylic acids are vinyl propionate, vinyl butyrate, vinyl 2-ethylhexanoate, vinyl laurate, 1-methylvinyl acetate, vinyl pivalate, vinyl esters of neodecanoic acid, and vinyl esters of alpha-branched monocarboxylic acids having 5 to 12 carbon atoms, as for example VeoVa9® or VeoVa10® (trade names of the company Resolution) or VERSA10® (trade name of Wacker Chemie AG). Particularly preferred are vinyl laurate, vinyl esters of neodecanoic acid, and the vinyl esters of alpha-branched carboxylic acids having 9 or 10 carbon atoms (VeoVa9®, VeoVa10® or VERSA10®). Generally 0 to 20 wt %, preferably 10 to 20 wt %, of the vinyl esters a3) are copolymerized, based in each case on the total weight of the comonomers.

Examples of further comonomers a4) copolymerizable therewith are ethylenically unsaturated monocarboxylic and dicarboxylic acids, preferably acrylic acid, methacrylic acid, and fumaric acid; ethylenically unsaturated carboxamides and carbonitriles, preferably acrylamide and acrylonitrile; diesters of fumaric acid such as the diethyl and diisopropyl esters, ethylenically unsaturated sulfonic acids and their salts, preferably vinylsulfonic acid, 2-acrylamido-2-methylpropanesulfonic acid. Other examples are precrosslinking comonomers such as polyethylenically unsaturated comonomers, examples being divinyl adipate, diallyl maleate, allyl methacrylate or triallyl cyanurate, or postcrosslinking comonomers, examples being acrylamidoglycolic acid (AGA), methylacrylamidoglycolic acid methyl ester (MAGME), N-methylolacrylamide (NMA), N-methylolmethacrylamide (NMMA), N-methylolallyl carbamate, alkyl ethers such as the isobutoxy ether or esters of N-methylolacrylamide, of N-methylolmethacrylamide and of N-methylolallyl carbamate. Also suitable are epoxide-functional comonomers such as glycidyl methacrylate (GMA) and glycidyl acrylate. Other examples are silicon-functional comonomers, such as acryloxypropyltri(alkoxy)- and methacryloxypropyltri(alkoxy)-silanes, vinyltrialkoxysilanes, and vinylmethyldialkoxysilanes, where alkoxy groups present may be, for example, methoxy, ethoxy and ethoxypropylene glycol ether radicals, especially vinyltrimethoxysilane and vinyltriethoxysilane. Mention may also be made of monomers having hydroxyl or CO groups, examples being hydroxyalkyl esters of acrylic and methacrylic acid such as hydroxyethyl, hydroxypropyl or hydroxybutyl acrylate or methacrylate, and also compounds such as diacetoneacrylamide and acetylacetoxyethyl acrylate or methacrylate. Further examples are also vinyl ethers, such as methyl, ethyl or isobutyl vinyl ether.

The auxiliary monomers a4) are copolymerized preferably in an amount of 0.5 to 10 wt %, based in each case on the total weight of the comonomers. Preferred auxiliary monomers are the ethylenically unsaturated monocarboxylic and dicarboxylic acids such as acrylic acid, methacrylic acid, and maleic acid (or anhydride), the ethylenically unsaturated sulfonic acids and their salts such as vinylsulfonic acid, the epoxide-functional comonomers such as glycidyl methacrylate, the silicon-functional comonomers such as vinyltriethoxysilane, and also mixtures of the stated auxiliary monomers. With preference no polyethylenically unsaturated comonomers are copolymerized.

Particularly preferred are copolymers of 80 to 95 wt % of vinyl acetate and 5 to 20 wt % of ethylene, and optionally auxiliary monomer a4) as well. Particularly preferred are also copolymers of 60 to 85 wt % of vinyl acetate a1), 1 to 30 wt % of ethylene a2), and 10 to 20 wt % of vinyl esters a3) of long-chain, optionally branched $C_3$ to $C_{12}$ carboxylic acids, and optionally auxiliary monomers a4) as well. The amounts in wt % add up in each case to 100 wt %.

The aqueous dispersions of the copolymer are produced by the emulsion polymerization process, with the polymerization temperature being in general 40° C. to 120° C., preferably 60° C. to 90° C., and with the operating pressure being in general 5 to 100 bar abs. The polymerization is initiated preferably with the redox initiator combinations that are customary for emulsion polymerization. Examples of suitable oxidation initiators are the sodium, potassium, and ammonium salts of peroxodisulfuric acid, and hydrogen peroxide. The stated initiators are used generally in an amount of 0.01 to 2.0 wt %, based on the total weight of the monomers. Examples of suitable reducing agents are sodium hydroxymethanesulfinate (Brüggolit), Brüggolit FF6, and (iso)ascorbic acid. The amount of reducing agent is preferably 0.01 to 3 wt %, based on the total weight of the monomers. The stated oxidizing agents, particularly the salts of peroxodisulfuric acid, can also be used on their own as thermal initiators.

The polymerization takes place in the presence of 2 to 10 wt %, based on the total weight of the comonomers, of one or more partially hydrolyzed polyvinyl alcohols which has a low molecular mass and a degree of hydrolysis of in each case 80 to 95 mol % and a Höppler viscosity, in 4% aqueous solution of in each case 1 to 5 mPas (Höppler method at 20° C., DIN 53015). The degree of hydrolysis of the partially hydrolyzed polyvinyl alcohols of low molecular mass is preferably 85 to 90 mol %, more preferably 87 to 89 mol %. The Höppler viscosity in 4% aqueous solution of the partially hydrolyzed polyvinyl alcohols of low molecular mass is preferably 2 to 4 mPas (Höppler method at 20° C., DIN 53015). Optionally it is also possible to use partially hydrolyzed polyvinyl alcohols of higher molecular mass, with a degree of hydrolysis of preferably 80 to 95 mol % and a Höppler viscosity in 4% aqueous solution of 6 to 40 mPas (Höppler method at 20° C., DIN 53015), alone or in a mixture with the partially hydrolyzed polyvinyl alcohols of low molecular mass. The stated polyvinyl alcohols are available commercially and accessible via methods known to the skilled person.

It is additionally possible optionally to use small amounts of emulsifiers in the polymerization as well, examples being anionic and/or nonionic emulsifiers, at 0.1 to 2.0 wt %, for example, based on the total weight of the comonomers. Examples of anionic emulsifiers are alkyl sulfates having a chain length of 8 to 18 carbon atoms, alkyl or alkylaryl ether sulfates having 8 to 18 carbon atoms in the hydrophobic moiety and up to 40 ethylene or propylene oxide units, alkyl- or alkylarylsulfonates having 8 to 18 carbon atoms, and full esters and monoesters of sulfosuccinic acid with monohydric alcohols. Examples of nonionic emulsifiers are $C_{12}$-$C_{14}$ fatty alcohol ethoxylates having a degree of ethoxylation of 3 to 20 ethylene oxide units. Preferably no emulsifiers are used during the polymerization, and no emulsifiers are added afterward as well.

The water-redispersable polymer powder (dispersion powder) a) is produced via drying of the corresponding aqueous dispersions of the copolymer. Drying takes place by means of spray drying in the presence of the mixture of at least one polyvinyl alcohol having a degree of hydrolysis of 80 to 95 mol % and a Höppler viscosity of 1 to 5 mPas, and of at least one polyvinyl alcohol having a degree of hydrolysis of 80 to 95 mol % and a Höppler viscosity of 6 to 40 mPas. The polyvinyl alcohols here are used in an amount such that their weight fraction in the dispersion powder is 2 to 30 wt %, based on the weight of the copolymer. The quantitative ratio of the fraction of low-viscosity polyvinyl alcohol to higher-viscosity polyvinyl alcohol is from 1:50 to 50:1, preferably from 1:10 to 10:1.

The spray drying is accomplished by atomization in a spray drier. The drying gas used is generally air. To accelerate the drying, the drying gas is preheated, preferably to an entry temperature of 130° C. to 210° C. (hot air). In general, antiblocking agent is added as well. Suitable antiblocking agents (anticaking agents) are known to the skilled person, with examples being aluminum silicates such as kaolin, fumed silica or precipitated silica, or carbonates such as calcium carbonate or magnesium carbonate.

The antiblocking agents are used generally in an amount of 0.1 to 30 wt %, preferably 2 to 30 wt %, more preferably 7 to 30 wt %, based in each case on the total weight of the polymeric constituents (copolymer and polyvinyl alcohols) of the polymer dispersion to be atomized. Optionally the antiblocking agent may also be added entirely or partly to the fully dried polymer powder before or after the latter has been separated from the drying gas.

The powder paint composition comprises generally 5 to 30 wt %, preferably 20 to 30 wt %, of one or more water-redispersable polymer powders a), based in each case on the total weight of the powder paint composition.

To optimize the viscosity and to optimize the opacity of the emulsion paints obtainable with the powder paints, preference is given to using water-redispersable polymer powders a) in the powder paint formula that have a polyvinyl alcohol fraction of 10 to 30 wt %, preferably 20 to 30 wt %, based in each case on the weight of the copolymer. These water-redispersable polymer powders a) with an increased polyvinyl alcohol fraction of preferably 20 to 30 wt % can be used alone or in a mixture with a water-redispersable polymer powder a) having a lower polyvinyl alcohol fraction in the powder paint formula.

The powder paint composition may also comprise one or more hydraulic binders, examples being cement (Portland cement, high-alumina cement, blast furnace cement, magnesia cement, phosphate cement), gypsum, lime, and waterglass. The fraction of hydraulic binder is preferably 0.1 to 10 wt %, based on the total weight of the powder paint composition.

By adding cement or lime to the dry formulation it is also possible to modify the pH of a powder paint in a targeted way in accordance with the requirements. Further examples of modifiers are siliconates such as potassium methylsiliconates, amines, polyamines, and polyethylenimines.

Formulations both with and without pH modifiers are possible.

Suitable pigments and the proportions thereof in a powder paint formula are known to the skilled person. Examples of pigments are inorganic pigments such as titanium dioxide, barium sulfate, boron nitride, and zinc oxide for white emulsion paints, iron oxides such as red iron oxide, sodium aluminum sulfosilicate (ultramarine blue Pigment Blue 29:77007). The proportion of the pigments in the powder paint composition is in general 1 to 35 wt %, preferably 5 to 15 wt %, based in each case on the total weight of the powder paint composition.

Suitable fillers are, for example, carbonates such as calcium carbonate in the form of chalk, dolomite and calcite. Also suitable are silicates such as quartz flour, feldspar, kaolin and talc. Also suitable are fibrous fillers such as cellulose fibers. Mixtures of fillers are frequently used in practice. The proportion of the fillers in the powder paint composition is in general 20 to 95 wt %, preferably 30 to 60 wt %, based in each case on the total weight of the powder paint composition.

Customary adjuvants c) in powder paint compositions are dispersants, wetting agents, thickeners, hydrophobizing agents, defoamers, film-forming assistants, plasticizers, and protective colloids. Such adjuvants are available commercially and the amounts in which they are used are known to the skilled person.

Examples of dispersants and wetting agents are sodium and potassium polyphosphates and also polyacrylic acids and their salts. They are used in general in fractions of 0.1 to 1 wt %, based on the total weight of the powder paint composition.

Examples of thickeners and protective colloids are cellulose ethers such as carboxymethylcellulose, hydroxyethylcellulose, starch and polyvinyl alcohol. Bentonite is one example of an inorganic thickener. The thickeners and protective colloids are used in general in an amount of in each case 0.01 to 2 wt %, based on the total weight of the powder paint composition.

Examples of hydrophobizing agents are silanes and fatty acid esters. Examples of defoamers are silicone oils and polyglycols.

Examples of film-forming assistants are ester alcohol mixtures such as Texanol®.

For producing the powder paint composition, the individual constituents can be mixed with one another in the form of their finely divided powders in a powder mixer. Another, alternative procedure for this is to mix the constituents b) and c) of the powder paint composition together with the aqueous dispersion of the copolymer in order to produce the water-redispersable polymer powder a), and subsequently to spray-dry this aqueous mixture. In that case a powder paint composition is obtained which is notable for particularly good dispersibility in water. The latter process is distinguished by a reduction in dusting during the production of the powder paint composition.

The powder paint composition is suitable for producing aqueous emulsion paints. For that purpose the water fraction can be introduced to start with and the powder paint composition can be admixed to the water with stirring, or the process may be reversed in order, with optional subsequent homogenization.

Relative to aqueous emulsion paints, the powder paint composition of the invention is distinguished by better storage stability. The powder paint composition is frost-stable and heat-stable, no skinning can occur, and the addition of biocide can be dispensed with. In comparison to aqueous emulsion paints, the powder paint composition has reduced packaging requirements. There is no need for packing in plastic pails. When the powder paint composition is worked, it is possible to produce exactly the required amount of emulsion paint. The use of the powder paint composition is therefore use-friendly and waste-free.

The examples which follow serve for further illustration of the invention:

The following dispersion powders were used for testing:

Dispersion powder 1 (DP 1):
Water-redispersable vinyl acetate-ethylene copolymer powder (85.5 wt % of vinyl acetate and 14.5 wt % of ethylene) with 13 wt %, based on VAE copolymer, of a polyvinyl alcohol mixture*.

Dispersion powder 2 (DP 2):
Water-redispersable vinyl acetate-ethylene-VERSA10® copolymer powder (53 wt % of vinyl acetate, 27 wt % of ethylene, and 20 wt % of VERSA10®) with 12 wt %, based on copolymer, of a polyvinyl alcohol mixture*.

Dispersion powder 3 (DP 3):
Water-redispersable vinyl acetate-ethylene-VERSA10® copolymer powder (69.3 wt % of vinyl acetate, 13.4 wt % of ethylene, and 17.3 wt % of VERSA10®) with 14 wt %, based on copolymer, of a polyvinyl alcohol mixture* and 2 wt %, based on copolymer, of a hydrophobizing agent (Silres® Powder D from Wacker Chemie AG).

Dispersion powder 4 (DP 4):
Water-redispersable vinyl acetate-ethylene-VERSA10® copolymer powder (69.3 wt % of vinyl acetate, 13.4 wt % of ethylene, and 17.3 wt % of VERSA10®) with 13 wt %, based on copolymer, of a polyvinyl alcohol mixture*.

Dispersion powder 5 (DP 5):

Water-redispersable vinyl acetate-ethylene copolymer powder (95 wt % of vinyl acetate and 5 wt % of ethylene) with 20 wt %, based on VAE copolymer, of a polyvinyl alcohol mixture*.

*polyvinyl alcohol mixture comprising a polyvinyl alcohol having a degree of hydrolysis of 88 mol % and a Höppler viscosity of 4 mPas and a polyvinyl alcohol having a degree of hydrolysis of 88 mol % and a Höppler viscosity of 13 mPas, in a weight ratio of 2:1.

TABLE 1

Powder paint composition and water fraction for emulsion paint:

| Formula ingredient | Mass [g] |
|---|---|
| Dispersion powder | 187.9 |
| TiO$_2$ pigment (Kronos 2190) | 62.6 |
| Thickener (Tylose MH 30.000 yp2) | 0.9 |
| Plasticizer (1,6-hexanediol) | 9.4 |
| CaCO$_3$ filler (Omyacarb 5 GU) | 197.9 |
| CaCO$_3$ filler (Omyacarb 2 GU) | 171.6 |
| Portland cement (Dykerhoff white) | 4.1 |
| Lime (Wallhalla fine lime hydrate) | 1.8 |
| Cellulose fiber (Arbocel BE 600-30 PU) | 47.4 |
| Dispersant (Calgon N) | 3.1 |
| Sum total of solid components | 686.7 |
| Water | 313.3 |
| Total | 1000.0 |

Test Methods:

Testing the scrub resistance SR (wet scrub resistance) of the emulsion paints:

The wet scrub resistance was determined by testing the emulsion paints produced from the powder paints in each case by the pad method in accordance with ISO 11998.

The emulsion paint was applied in each case with an applicator in a film thickness of 300 μm (wet) to a Leneta film (PVC film).

The coated film was then stored for 72 hours under standard conditions (DIN 50014, 23° C. and 50% relative humidity), thereafter for 24 hours at 50° C., and finally for 24 hours under standard conditions.

This gave a dry layer thickness of around 200 μm.

Then three test strips in each case with dimensions of 2.5 cm×7.5 cm were cut out and subsequently weighed.

Using these strips, the abrasion testing was carried out with 200 cycles, followed by weighing again. From the color density of the abraded area and the loss of mass of the paint film, the paint erosion in μm was then computed.

An average was determined in each case from three measurements.

The scrub resistance after 200 cycles is evaluated in classes:

Class 1 with abrasion of less than 5 μm,

Class 2 with abrasion of between 5 μm and less than 20 μm,

Class 3 with abrasion of between 20 μm and less than 70 μm.

Measuring the Brookfield viscosities BF1, BF10 and BF100 of the emulsion paints:

The Brookfield viscosity of the emulsion paints produced with the powder paint compositions was measured in each case using a Brookfield BF 35 viscometer, after conditioning at 23° C., in each case using the spindle indicated in the operating instructions, at 1 revolution per minute (BF1), at 10 revolutions per minute (BF10) and at 100 revolutions per minute (BF100).

The measurements were made immediately after the blending of the emulsion paints (table 2) or after storage for 1 week under standard conditions (table 3).

The viscosity is reported in mPas in each case.

Measuring the particle sizes Dn and Dw in the emulsion paint:

The number-average particle size Dn and the weight-average particle size Dw of the emulsion paints were measured by means of laser diffraction using the Beckman Coulter LS 13320 particle size measuring instrument in accordance with instrument specification, in each case after storage under standard conditions for 24 hours after blending.

The particles in the emulsion paint may be not only the individual constituents such as filler, pigment or polymer, but also agglomerates thereof with varying composition.

Determining the specific surface area SSA of the particles in the emulsion paint:

The specific surface area SSA of the particles dispersed in the emulsion paint was determined via calculation, starting from the values obtained when measuring the particle size.

The specific surface area is reported in m$^2$/g of solid in the emulsion paint.

Determining the opacity of the emulsion paints:

The opacity was ascertained using the method in accordance with DIN EN 13300 that is described in the "Guideline for determining the hiding power" of the German Paint Industry Association, July 2002 edition.

The emulsion paints were each applied using an automatic film applicator, featuring a coater having a slot height of 150 μm and 225 μm, to black-white contrast charts (type 3H from Leneta) with tristimulus value Y over black of 7 or less and tristimulus value Y over white of 80 to 90.

The contrast charts thus coated were dried for 24 hours at 23° C. and 50% relative humidity and then weighed.

The coverage in m$^2$/l was calculated in each case from the application rate in g/m$^2$ and the color density.

A colorimeter (Elrepho 450X of Datacolor) was used to measure the tristimulus values Y (color standards) over the black and white backgrounds, and the "contrast ratio" in "%" was calculated.

The values thus determined for the contrast ratio were plotted in a diagram against the corresponding coverage (m$^2$/l). Through interpolation, a determination was made of the coverage E at 7 m$^2$/l for a contrast ratio of 98%.

The higher the coverage E, the better the opacity.

The results of measurement are summarized in table 2.

TABLE 2

| Powder | SR μm | BF1 mPas | BF10 mPas | BF100 mPas | Dw μm | Dn μm | SSA m$^2$/g | E 7 m$^2$/l |
|---|---|---|---|---|---|---|---|---|
| DP 1 | 7.9 | 157 200 | 26 000 | 6750 | 6.3 | 0.108 | 15.7 | 91.8 |
| DP 2 | 8.8 | 203 000 | 39 800 | 8150 | 6.1 | 0.109 | 14.1 | 92.0 |
| DP 3 | 7.2 | 116 000 | 19 700 | 4690 | 7.3 | 0.108 | 14.8 | 92.8 |
| DP 4 | 8.2 | 154 000 | 28 300 | 6680 | 7.0 | 0.108 | 14.8 | 92.3 |
| DP 5 | 10.9 | 238 000 | 37 000 | 7520 | 3.3 | 0.109 | 17.0 | 93.7 |

Polyvinyl alcohol is a protective colloid which partially takes over dispersing properties in a paint formulation. With an increasing fraction of polyvinyl alcohol in the dispersion powder of the powder paint composition, a finer particle distribution of fillers and pigments is achieved, which can be observed from the increasing magnitude of the specific particle surface area SSA and from an improvement in the opacity E (comparison of specific surface area SSA and opacity E of the formulas with powder DP 1 and powder DP 5).

Modifying the copolymer with long-chain vinyl ester monomers (DP 2, DP 3, DP 4) adds a hydrophobizing effect and is able to improve the properties of a paint in terms of requirements for water-repelling properties.

Carrying out modification with long-chain vinyl esters additionally provides a retardant effect on the incipient swelling properties of a polymer in a paint formulation, this effect being measurable indirectly via increase in viscosity over time (see comparison of formulas with DP 1 and DP 2 in table 3).

TABLE 3

| Powder | BF10, immediate mPas | BF10, 1 week mPas |
|---|---|---|
| DP 1 | 26 000 | 33 900 |
| DP 2 | 39 800 | 60 700 |

In the formula of table 4, an emulsion paint was produced using a powder paint composition without modifiers (cement, lime).

In the powder paint formula, dispersion powder 1 (VAE with relatively low polyvinyl alcohol content) was blended with a small fraction of dispersion powder 5 (VAE with relatively high polyvinyl alcohol content).

TABLE 4

| Formula ingredient | Mass [g] |
|---|---|
| Dispersion powder 1 | 172.8 |
| Dispersion powder 5 | 9.1 |
| TiO$_2$ pigment (Kronos 2190) | 60.6 |
| CaCO$_3$ filler (Socal P2) | 236.4 |
| Kaolin filler (Mattex Pro) | 121.2 |
| Cellulose fiber (Arbocel BE 600-30 PU) | 45.8 |
| Dispersant (Calgon N) | 3.0 |
| Wetting agent (METOLAT P 588) | 9.1 |
| Sum total of solid components | 658.0 |
| Water | 342.0 |
| Total | 1000.0 |

This produced a marked improvement in the opacity E: 98.6% at 7 m$^2$/l (for comparison: DP 1 alone in table 2: 91.8% at 7 m$^2$/l).

The invention claimed is:

1. A powder paint composition comprising:
   wherein the powder paint composition comprises a) at least one water-redispersable polymer powder, b) pigment and filler, and c) optionally one or more adjuvants and/or optionally one or more hydraulic binders;
   wherein the water-redispersable polymer powder comprises a) a polyvinyl alcohol-stabilized copolymer based on monomers consisting of
   a1) 50 to 95 wt % of vinyl acetate,
   a2) 1 to 30 wt % of ethylene, and
   a4) 0 to 10 wt % of further ethylenically unsaturated comonomers copolymerizable therewith;
   wherein the amounts in wt % adding up in each case to 100 wt %, and
   wherein the further ethylenically unsaturated comonomers a4) are selected from the group consisting of ethylenically unsaturated monocarboxylic and dicarboxylic acids, ethylenically unsaturated carboxamides and carbonitriles, diesters of fumaric acid, ethylenically unsaturated sulfonic acids and their salts, polyethylenically unsaturated comonomers, acrylamidoglycolic acid (AGA), methylacrylamidoglycolic acid methyl ester, N-methylolacrylamide, N-methylolmethacrylamide, N-methylolallyl carbamate, isobutoxy ether or esters of N-methylolacrylamide, isobutoxy ether or esters of N-methylolmethacrylamide, isobutoxy ether or esters of of N-methylolallyl carbamate, epoxide-functional comonomers, silicon-functional comonomers, hydroxyalkyl esters of acrylic and methacrylic acid, diacetoneacrylamide, acetylacetoxyethyl acrylate, acetylacetoxyethyl methacrylate and vinyl ethers;
   wherein the polyvinyl alcohol comprises a mixture of at least one polyvinyl alcohol having a degree of hydrolysis of approximately 80 to approximately 95 mol % and a Höppler viscosity (4% aqueous solution, Höppler method at 20° C., DIN 53015) of approximately 1 to approximately 5 mPas and at least one polyvinyl alcohol having a degree of hydrolysis of approximately 80 to approximately 95 mol % and a Höppler viscosity of 6 to 40 mPas; and
   wherein the powder paint composition has the one or more hydraulic binders therein comprising approximately 0.1 to approximately 10 wt % of hydraulic binder, based on the total weight of the powder paint composition".

2. The powder paint composition of claim 1, wherein the copolymer comprises approximately 80 to approximately 95 wt % of the vinyl acetate a1), approximately 5 to approximately 20 wt % of the ethylene a2), and optionally the ethylenically unsaturated comonomers a4).

3. The powder paint composition of claim 1, wherein the copolymer comprises approximately 60 to approximately 85 wt % of the vinyl acetate a1), approximately 1 to approximately 30 wt % of the ethylene a2), approximately 10 to approximately 20 wt % of vinyl esters of long-chain, optionally branched C$_3$ to C$_{12}$ carboxylic acids a3), and optionally the ethylenically unsaturated comonomers a4).

4. The powder paint composition of claim 1, wherein the water-redispersable polymer powder has a polyvinyl alcohol fraction of approximately 2 to approximately 30 wt %, based on the weight of the copolymer.

5. The powder paint composition of claim 1, wherein the water-redispersable polymer powder a) has an increased polyvinyl alcohol fraction of approximately 20 to approximately 30 wt % and is comprised, alone or in a mixture with another water-redispersable polymer powder a) having lower polyvinyl alcohol fraction.

6. The powder paint composition of claim 1, wherein the powder paint composition comprises one or more hydraulic binders.

7. The powder paint composition of claim 6, wherein the one or more hydraulic binders are cement, gypsum, lime and/or waterglass.

8. The powder paint composition of claim 1, wherein the powder paint composition further comprises one or more modifiers.

9. The powder paint composition of claim 1, wherein the powder paint composition is used to prepare an aqueous paint emulsion.

10. The powder paint composition of claim 1, wherein the powder paint composition does not include any hydraulic binders.

11. The powder paint composition of claim 1, wherein the powder paint composition is frost stable and heat stable.

12. The powder paint composition of claim 1, wherein the powder paint composition further comprises a biocide.

13. The powder paint composition of claim 1, wherein the powder paint composition is an aqueous paint emulsion having a scrub resistance of 7.9 μm to 10.9 μm.

14. The powder paint composition of claim 13, wherein the scrub resistance is a wet scrub resistance determined by a pad method in accordance with ISO 11998.

15. The powder paint composition of claim 13, wherein the scrub resistance is achieved after 200 cycles.

16. The powder paint composition of claim 1, wherein the powder paint composition is an aqueous paint emulsion has an opacity of 91.8% to 98.6% at 7 m$^2$/l; and
wherein the opacity is determined in accordance with DIN EN 13300.

17. The powder paint composition of claim 1, wherein the powder paint composition is an aqueous paint emulsion having a dry layer thickness of around 200 μm.

18. The powder paint composition of claim 1, wherein the powder paint composition is an aqueous paint emulsion that is used as a wall paint that is applied to an interior sector or an interior wall of an object.

* * * * *